(No Model.) 2 Sheets—Sheet 1.

W. C. MACKINNEY.
BEARING FOR PULLEY SHAFTS OF CHAIN GEARING.

No. 305,699. Patented Sept. 23, 1884.

WITNESSES:
David S. Williams
Harry Drury

INVENTOR:
William C. Mackinney
by his Attorneys
Howson and Sons (No Model.)  2 Sheets—Sheet 2.
W. C. MACKINNEY.
BEARING FOR PULLEY SHAFTS OF CHAIN GEARING.
No. 305,699.  Patented Sept. 23, 1884.
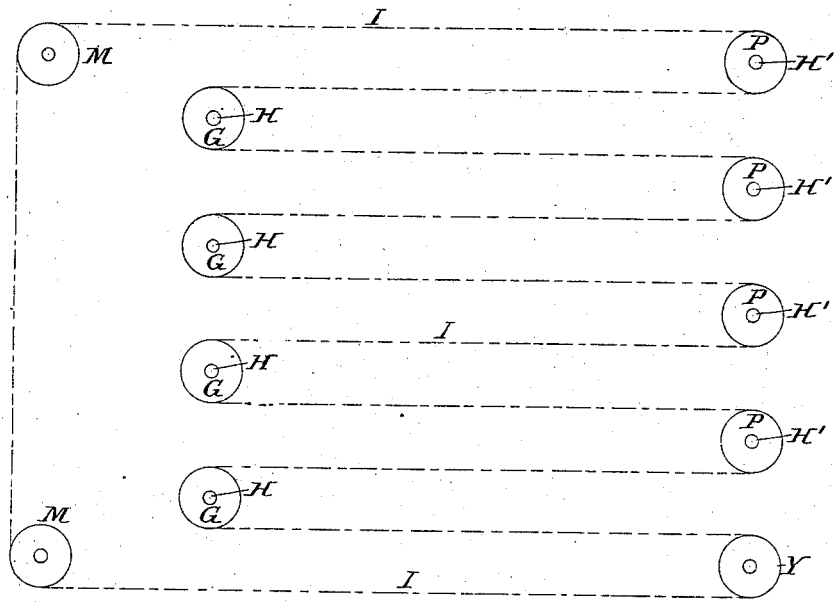
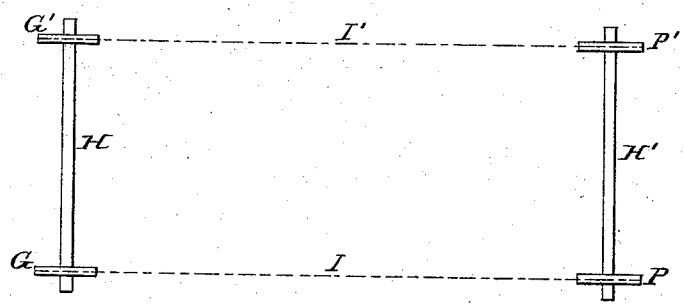
Witnesses:
John M. Clayton
Harry Drury
Inventor:
Wm. C. Mackinney
by his Attorneys
Howson & Sons

United States Patent Office.

WILLIAM C. MACKINNEY, OF PHILADELPHIA, PENNSYLVANIA, ASSIGNOR TO JAMES BUTTERWORTH, CHARLES C. BUTTERWORTH, AND WILLIAM D. BUTTERWORTH, ALL OF SAME PLACE.

BEARING FOR PULLEY-SHAFTS OF CHAIN-GEARING.

SPECIFICATION forming part of Letters Patent No. 305,699, dated September 23, 1884.

Application filed June 30, 1884. (No model.)

*To all whom it may concern:*

Be it known that I, WILLIAM C. MACKINNEY, a citizen of the United States, residing in Philadelphia, Pennsylvania, have invented certain Improvements in Chain-Gearing, of which the following is a specification.

The object of my invention is to maintain in a tight condition throughout endless chains which take a zigzag course and pass over a series of pulleys on shafts; and this object I attain in the manner which I will proceed to describe, reference being had to the accompanying drawings, in which—

Figure 2:
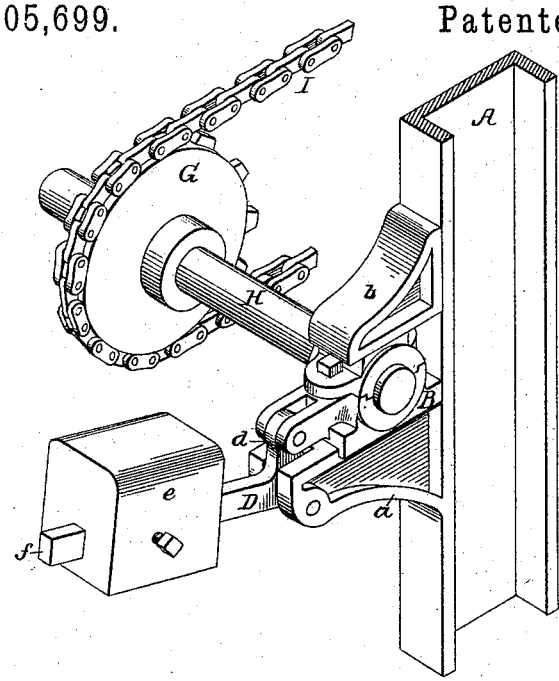
Figure 1:
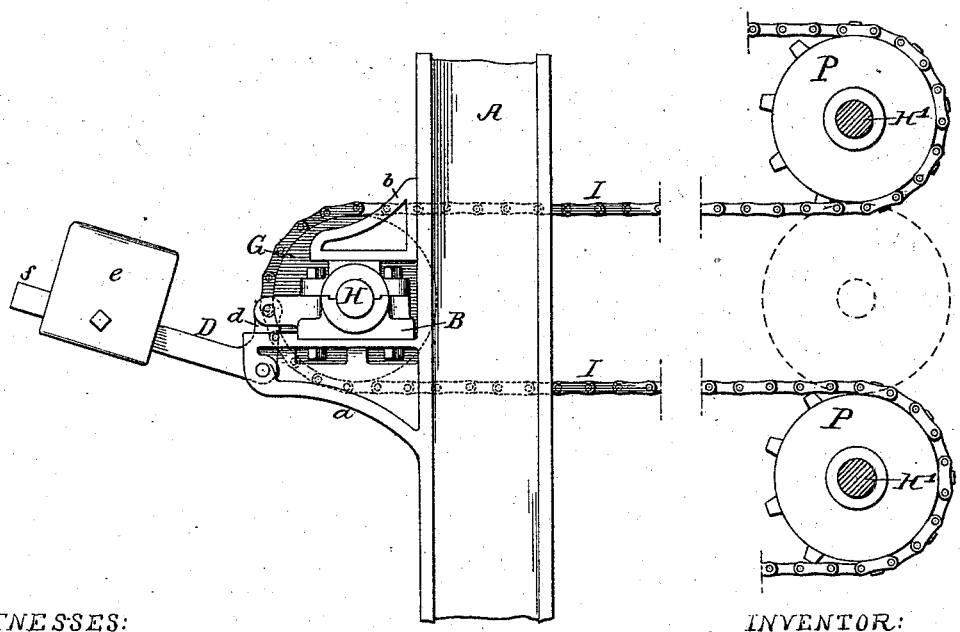

Figure 1, Sheet 1, is a side view of the tightening device; Fig. 2, a perspective view of the same; and Figs. 3 and 4, Sheet 2, diagrams illustrating my invention, Fig. 3 being an elevation or side view, and Fig. 4 a plan view.

I will refer, in the first instance, to the diagrams on Sheet 2. A series of shafts, H, carry chain-pulleys G G'—two on each shaft—and another series of shafts, H', carry sprocket-wheels P P', two on each shaft. An endless chain, I, passes over the pulleys G and sprocket-wheels P, and over any suitable system of guiding-pulleys, M, M, and Y, and a similar chain, I', passes over the pulleys G' and sprocket-wheels P', and over suitable guiding-pulleys. The pulleys G G' simply guide the two chains which are driven by the sprocket-wheels, all of the shafts H' being driving-shafts. Owing to wearing of the links or pins of each chain at some points of the same more than at others, portions of the chain will sag between the pulleys, and the prevention of this is an important desideratum, especially in tentering-machines and in other connections in which driven endless chain, taking the zigzag course shown, may be used.

In order to maintain the chain tight throughout its entire length, I adapt the series of shafts H to yielding bearings, and combine with the said bearings tension devices, each tension device acting independently of the other.

Referring to Figs. 1 and 2, which show the tension mechanism used in connection with the chain-gearing, A is part of a frame on which are two projections or brackets, a b, and between the latter is confined vertically a bearing-block, B, but in such a manner that the said block can slide horizontally between the said brackets. To this bearing-block is adapted one of the aforesaid shafts H, G being one of the above-mentioned pulleys on the said shaft. The short arm d of a bell-crank lever, D, is connected to the block in any suitable manner, the lever being pivoted to the bracket a, and its long arm f being provided with a weight, e, which is preferably adjustable on the said arm. There is another bearing (not shown) for the opposite end of the shaft, this being also controlled by a weighted lever in the manner described. The bearings of all the shafts H are controlled by these tension devices, which, however, must act independently of each other, so that there can be no sagging of any part of the chain.

I claim as my invention—

1. A series of shafts, H, yielding bearings therefor, and chain-pulleys on the said shafts, and a series of shafts, H', carrying sprocket-wheels, in combination with chains passing round the said wheels, and independent tension devices for the said yielding bearings of the shafts H, all substantially as set forth.

2. The combination of the shaft H and its chain-pulley, the bearing-block B, adapted to guiding-brackets a b on a frame, with the bell-crank lever D, having a short arm connected to the bearing-block, and a weighted long arm, substantially as set forth.

In testimony whereof I have signed my name to this specification in the presence of two subscribing witnesses.

WM. C. MACKINNEY.

Witnesses:
JOHN M. CLAYTON,
HARRY SMITH.